United States Patent Office 2,871,259
Patented Jan. 27, 1959

2,871,259

METHOD OF PRODUCING CARBAMATE ESTERS

Joseph Levy, Paramus, N. J., assignor to The Trubek Laboratories East Rutherford, N. J., a corporation of New Jersey No Drawing. Application December 10, 1956
Serial No. 627,098

10 Claims. (Cl. 260—482)

This invention relates to methods of producing alkyl carbamates and is directed particularly to methods whereby high yields of the lower alkyl carbamates, namely, methyl, ethyl and propyl carbamates, can be obtained.

The reaction which takes place between urea and an alcohol in producing alkyl carbamates is well known and may be represented by the equation

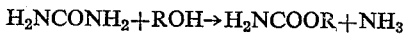
$$H_2NCONH_2 + ROH \rightarrow H_2NCOOR + NH_3$$

This reaction takes place readily at temperatures above about 130° C. but proceeds so slowly at lower temperatures as to be of little or no commercial value. When higher alcohols are used the reaction can be carried out in an open vessel. However, when the lower alcohols are employed, in order to attain the desired temperature, the reaction must be carried out in a closed vessel with the result that pressure is developed and the ammonia evolved tends to react with the carbamate ester produced resulting in a reversal of the reaction in accordance with the equation

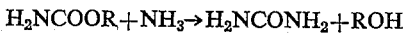
$$H_2NCOOR + NH_3 \rightarrow H_2NCONH_2 + ROH$$

As a result of such reversal, the yield of the carbamate ester obtained is limited. Moreover, the isolation of the carbamate ester produced from the relatively large amount of unreacted urea contained in the reaction mixture involves cumbersome and costly extraction and crystallization procedures for the separation of these solid materials. The problems thus presented have heretofore rendered such method unsuitable for the commercial production of the lower carbamate esters.

In accordance with the present invention these objections and limitations encountered in the production of the lower alkyl carbamates are overcome and methods provided whereby a high yield of substantially pure alkyl carbamates is obtained.

The advantages of the present invention are attained by carrying out the process in the presence of a substantially stable solvent or liquid diluent which is non-volatile under the conditions of reaction and which serves to retain the urea in solution or suspension during distillation of the carbamate ester from the reaction mixture. The preferred solvents or diluents employed are polyalkylene glycols or mixtures thereof having an average molecular weight between about 150 and 600. It has been discovered that such glycols are very satisfactory solvents for urea. However, other liquid diluents in which urea is less soluble may be employed if used in larger quantity. The solvents or diluents should be substantially stable under the conditions of reaction and have sufficiently low volatility to permit the carbamate ester produced to be separated from the reaction mixture by fractional distillation. Such isolation of the carbamate ester in substantially pure state by simple distillation is not feasible in the absence of a suitable solvent for the unreacted urea. Moreover, the unreacted alcohol and urea as well as the solvent from which the esters have been separated can be reused so as to render the process cyclic in operation with minimum losses of materials. As a result it is possible to obtain a high yield of a pure product.

The principal object of the present invention is to provide novel methods for producing lower alkyl carbamates whereby a high yield of a substantially pure product may be obtained.

Another object of the invention is to simplify the separation of lower alkyl carbamates from the reactants from which it is produced.

A further object of the invention is to separate carbamate esters from reaction mixtures containing urea by fractional distillation of the ester in the presence of a solvent or liquid diluent for the urea employed in amount sufficient to retain the urea in solution or suspension during the distillation operation.

A specific object of the invention is to effect reaction between urea and an alcohol in the presence of a polyalkylene glycol having an average molecular weight between about 150 and 600.

These and other objects and features of the present invention will appear from the following description thereof wherein reference is made to typical and preferred procedures and compositions for the purpose of indicating the nature of the invention but without intending to limit the invention thereby.

While the present invention may be used in producing substantially any carbamate esters by reaction between urea and an alcohol, it is of particular value in producing the lower alkyl esters of carbamic acid and specifically methyl carbamate, ethyl carbamate (urethane) and propyl carbamate. For such purposes methyl alcohol, ethyl alcohol or propyl alcohol may be reacted with urea.

The reaction is carried out at temperatures above about 130° C. but if the temperature goes much higher than 180° C., various side reactions take place, and therefore the preferred temperature of the reaction is from about 140° C. to 150° C.

The solvent for urea should have a boiling point substantially above that of the carbamate ester to be produced, or should have sufficiently low volatility at such temperatures as to permit the ester to be distilled from the solvent at reduced pressure. Such a solvent will inherently be less volatile than the alcohol used in carrying out the reaction so that unreacted alcohol can also be separated therefrom. The solvent also should be sufficiently inert or stable under the reaction conditions so that it can be continuously recycled and will not give rise to objectionable side reactions which interfere with the process.

The preferred solvents used in carrying out the reaction are liquid polyalkylene glycols having an average molecular weight of from about 150 to about 600. Typical of such solvents are triethylene glycol, tetraethylene glycol, tripropylene glycol and various other polyethylene or polypropylene glycols, or mixtures thereof, having the desired average molecular weight. If the molecular weight of the polyalkylene glycol solvent is more than about 600, the amount of urea which can be dissolved therein is quite limited. The polypropylene glycols in general are not as good solvents as the polyethylene glycols but can be used if employed in sufficient amounts. Similarly, methoxypolyethylene glycols, hydroxypropylated and hydroxyethylated derivatives of ethylenediamine and other liquid diluents in which urea is at least slightly soluble and which have the desired low volatility and the desired stability can be used. However, polyethylene glycol having an average molecular weight of 200, known as "polyethylene glycol 200" is preferred. Such solvents have also been found to be solvents for the lower carbamate esters.

The alcohol used in carrying out the reaction is preferably in substantial excess of that theoretically required. From about 4 to 8 moles of alcohol for each mole of urea used is preferred.

The duration of the reaction may be varied and will depend upon the temperature employed and the degree of conversion desired. Since the unreacted agents employed may be recycled to repeat the process it is not necessary to obtain the highest possible conversion in each stage of the process. In general, when producing urethane a reaction time of about 3 hours is sufficient for any one stage of the operation. The heating can then be stopped and after cooling the alcohol is first distilled off. The urethane is then separated from the remaining reaction mixture by distillation under reduced pressure leaving a liquid residue consisting of the unreacted urea plus some urethane dissolved in the glycol. Sufficient alcohol and urea can then be added to this residual material to make up the desired charge whereupon the process may be repeated.

By continuing the operation in this manner, it is possible to obtain a high yield of the carbamate ester. Thus, about 50% of the urea is converted to carbamate ester during any one stage of the process. However, on continuously recycling the recovered products it is possible to obtain a yield of about 99% of theory based on the reacted urea. Moreover, the process can be carried out very readily while using conventional equipment so that the cost of producing the esters of carbamic acid is greatly reduced.

Furthermore, the process is also suitable for continuous operation wherein a solution of the reagents is continuously introduced into a reaction zone and then discharged after a desired retention time.

In order to illustrate typical procedure in accordance with the present invention, the following examples are cited.

Example 1

180 grams of urea, 1200 grams of ethyl alcohol and 100 grams of polyethylene glycol-200 were charged into an autoclave and the mixture heated at about 140° C. for 3 hours. A pressure of about 250 lbs. per square inch developed in the vessel. After cooling, the contents of the autoclave were removed and the alcohol distilled off. The recovered alcohol contained ammonia and some urethane. The liquid residue remaining after the alcohol had been removed was then distilled under about 5 mm. pressure until the pot temperature reached about 100° C. There was obtained 140.3 grams of urethane (52.5% of theory) distilling at about 70° at this pressure. The residual material remaining in the vessel was fluid at about 50° C. It weighed 180.5 grams and consisted of the polyethylene glycol, about 70 grams of unreacted urea, and about 10 grams of urethane not removed by distillation.

Example 2

The process of Example 1 was repeated, but at the conclusion of the process the recovered alcohol, containing ammonia and urethane, was returned to the vessel together with sufficient alcohol and urea to make up the original charge. The operation was then repeated whereupon urethane amounting to 50% of theory was recovered.

In a series of four successive runs as described above, a total of 553 grams of urethane were obtained, representing a yield of 77% based upon the total amount of 485 grams of urea charged into the vessel. Taking into consideration the unreacted urea and also the urethane contained in both the residue and the recovered alcohol, the yield of urethane based on reacted urea is about 99% of theory.

Example 3

The procedure of Example 1 was repeated using 180 grams of urea, 600 grams of ethyl alcohol and 100 grams of polyethylene glycol-200. On distillation there was obtained 96.4 grams of urethane (36% of theory). The residue remaining after distillation of the urethane contained about 100 grams unreacted urea and was fluid at about 80° C.

Example 4

The procedure of Example 1 was repeated using 180 grams urea, 1200 grams ethyl alcohol, and 100 grams tripropylene glycol. On distillation there was obtained 130.6 grams urethane. The residual glycol plus unreacted urea was a fluid slurry at about 90° C. with the bulk of the urea dissolved in the glycol.

Example 5

180 grams urea, 1570 grams n-propanol, and 100 grams polyethylene glycol-200 were charged into an autoclave and the mixture heated at about 145° C. for about 3 hours. A pressure of about 150 lbs. per square inch developed in the vessel. After cooling the contents of the autoclave were removed and the n-propanol distilled off. The liquid residual material was then distilled at about 4 mm. of pressure until a pot temperature of about 100° C. There was obtained 120.3 grams propyl carbamate melting at 55.5° to 58.5° C. On redistillation the bulk of the material distilled at 78–79° C. at about 4 mm. pressure and melted at 57–59° C.

The liquid diluent or solvent for the urea employed in carrying out the present invention is sufficient in amount to maintain the reaction mixture in the form of a solution or liquid slurry from which the unreacted urea does not settle out or accumulate in a manner to interfere with the fractional distillation of the carbamate ester from the mixture. Accordingly, the amount of diluent used in any case will depend somewhat upon the degree to which the urea is soluble therein. When the solubility of the urea in the diluent is limited larger amounts of the diluent should be employed. In any event, the diluent selected should be such as to avoid undesired side reactions which tend to reduce the yield of the carbamate esters produced.

While the yield of the esters obtained in any one cycle of the operation may be 50% or less of the theoretical yield, the esters contained in the alcoholic distillate removed and remaining in the reaction mixture after fractional distillation are not lost but are returned or present in carrying out a succeeding cycle of the operation. As a result, the carbamate esters formed are ultimately recovered as the cycle is repeated so as to afford a high over-all yield based upon the amount of the urea employed.

The conditions under which the reactions are carried out such as the time, temperature and pressures maintained as well as the proportions of the reactants used are capable of wide variation within the limits indicated. In view thereof it should be understood that the particular embodiments of the invention described above and set forth in the examples cited are intended to be illustrative only and are not intended to limit the scope of the invention.

I claim:

1. The method of producing lower alkyl carbamate esters which comprises heating urea and a lower aliphatic alcohol under pressure to a temperature between about 130° C. and 180° C. in the presence of a substantially stable solvent for the urea which has a higher boiling point than the carbamate ester, and distilling off the carbamate ester produced from the unreacted urea and solvent remaining in the reaction mixture.

2. The method of producing urethane which comprises heating urea and ethyl alcohol under pressure to a temperature between about 130° C. and 180° C. in the presence of a substantially stable solvent for urea having a boiling point above that of urethane, and thereafter separating urethane by distillation from the unreacted urea and solvent remaining in the reaction mixture.

3. The method of producing lower alkyl carbamate esters which comprises heating urea and a lower aliphatic alcohol under pressure to a temperature of about 130° C. to 180° C. in the presence of a solvent for urea comprising a polyalkylene glycol having an average molecular weight from about 150 to 600, and thereafter distilling off the carbamate ester produced from the unreacted urea and solvent remaining in the reaction mixture.

4. The method of producing lower alkyl carbamate esters which comprises heating urea and a lower aliphatic alcohol under pressure for a period of about 3 hours to a temperature of abut 130° C. to 180° C. in the presence of a solvent for urea comprising a polyalklene glycol having an average molecular weight from about 150 to 600, and thereafter distilling off the carbamate ester produced from the unreacted urea and solvent remaining in the reaction mixture.

5. The method of producing lower alkyl carbamate esters which comprises heating urea and a lower aliphatic alcohol under pressure to a temperature of about 130° C. to 180° C. in the presence of a solvent for urea comprising a polyethylene glycol having an average molecular weight from about 150 to 600, and thereafter distilling off the carbamate ester produced from the unreacted urea and solvent remaining in the reaction mixture.

6. The method of producing lower alkyl carbamate esters which comprises heating urea and a lower aliphatic alcohol under pressure for a period of about 3 hours to a temperature of about 130° C. to 180° C. in the presence of a solvent for urea comprising a polyethylene glycol having an average molecular weight from about 150 to 600, and thereafter distilling off the carbamate ester produced from the unreacted urea and solvent remaining in the reaction mixture.

7. The method of producing lower alkyl carbamate esters which comprises heating urea and a lower aliphatic alcohol under pressure to a temperature of about 130° C. to 180° C. in the presence of a solvent for urea comprising a polyalkylene glycol having an average molecular weight from about 150 to 600, and thereafter distilling off the carbamate ester produced from the unreacted urea and solvent remaining in the reaction mixture, adding more alcohol and urea to the remaining reaction mixture and repeating the cycle of operation.

8. The method of producing lower alkyl carbamate esters which comprises charging into a closed vessel 1 mole of urea and from about 4 to 8 moles of a lower aliphatic alcohol together with a solvent for urea comprising a polyalkylene glycol having a molecular weight of about 150 to 600, heating the resulting charge for a period of about 3 hours to a temperature of about 130° C. to 180° C. while maintaining the reaction mixture under pressure, thereafter cooling the reaction mixture, distilling off unreacted alcohol from the reaction mixture, and thereafter distilling off alkyl carbamate ester produced from the unreacted urea and solvent remaining in the reaction mixture.

9. The method of producing lower alkyl carbamate ester which comprises charging into a closed vessel 1 mole of urea and from about 4 to 8 moles of a lower aliphatic alcohol together with a solvent for urea comprising a polyalkylene glycol having a molecular weight of about 150 to 600, heating the resulting charge for a period of about 3 hours to a temperature of about 130° C. to 180° C., while maintaining the reaction mixture under pressure, thereafter cooling the reaction mixture, distilling off unreacted alcohol from the reaction mixture, and thereafter distilling off the alkyl carbamate ester produced from the unreacted urea and solvent remaining in the reaction mixture, adding to the product remaining sufficient alcohol and urea to renew the initial charge and repeating the operation.

10. The method of producing urethane which comprises forming a charge by mixing 1 mole of urea with about 4 to 8 moles of ethyl alcohol and a solvent for urea comprising a polyethylene glycol having an average molecular weight of about 150 to 600, heating the mixture to about 130° C. to 180° C. for a period of about 3 hours while maintaining the reaction mixture under pressure, thereafter cooling the reaction mixture, distilling off unreacted alcohol and then distilling off urethane under reduced pressure from the unreacted urea and solvent remaining in the reaction mixture.

References Cited in the file of this patent

FOREIGN PATENTS 531,030     Great Britain _____ Dec. 27, 1940

OTHER REFERENCES

Jacobson: J. A. C. S., vol. 60, pp. 1742–4 (1930).